No. 612,360. Patented Oct. 11, 1898.
T. J. LINDSAY.
MOTOR VEHICLE.
(Application filed May 9, 1898.)
(No Model.) 6 Sheets—Sheet 2.

WITNESSES:    INVENTOR
Thomas J. Lindsay.
BY
Chester Bradford,
ATTORNEY.

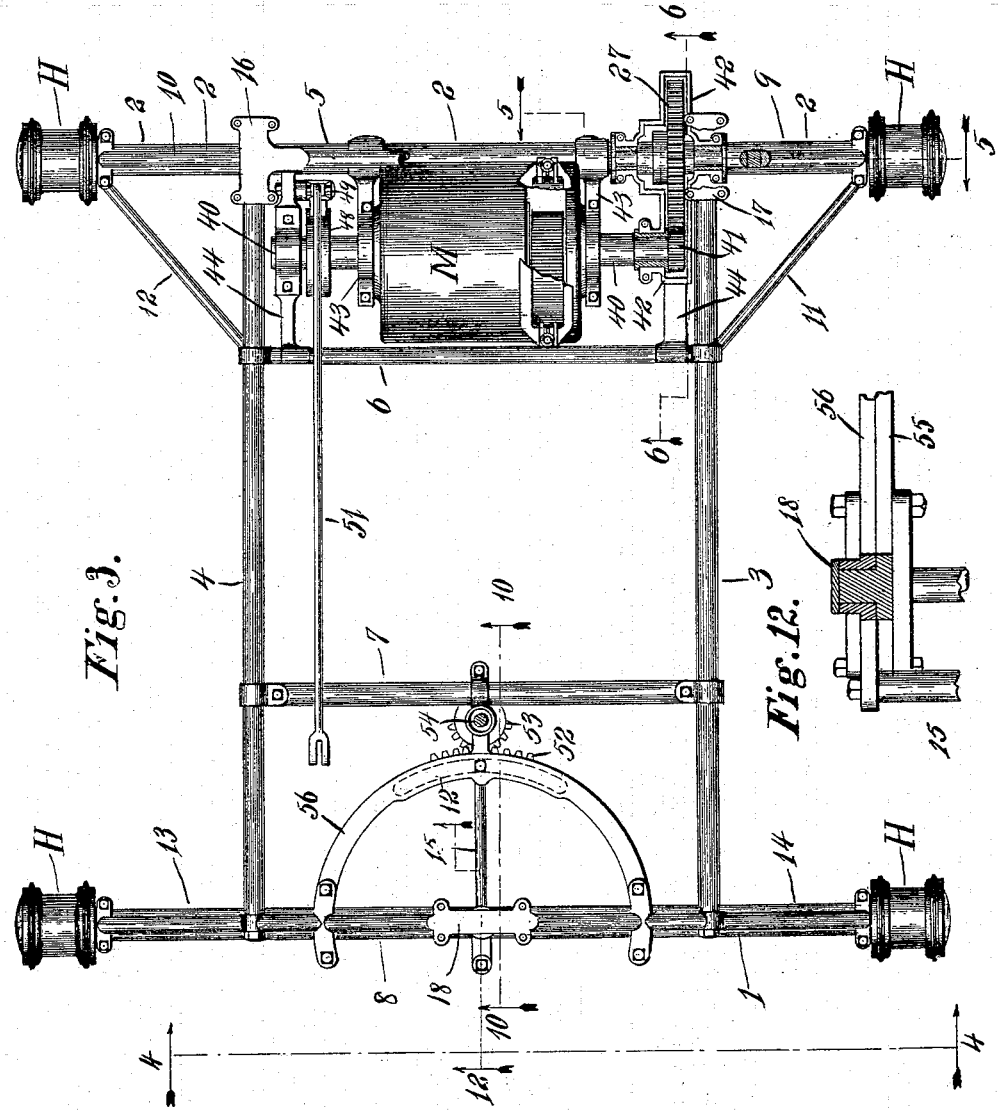

No. 612,360. Patented Oct. 11, 1898.
T. J. LINDSAY.
MOTOR VEHICLE.
(Application filed May 9, 1898.)
(No Model.) 6 Sheets—Sheet 4.

WITNESSES:
G. Chas. Conner.
J. A. Walsh

INVENTOR
Thomas J. Lindsay
BY
Chester Bradford,
ATTORNEY.

THE NORRIS PETERS CO., PHOTO-LITHO., WASHINGTON, D. C.

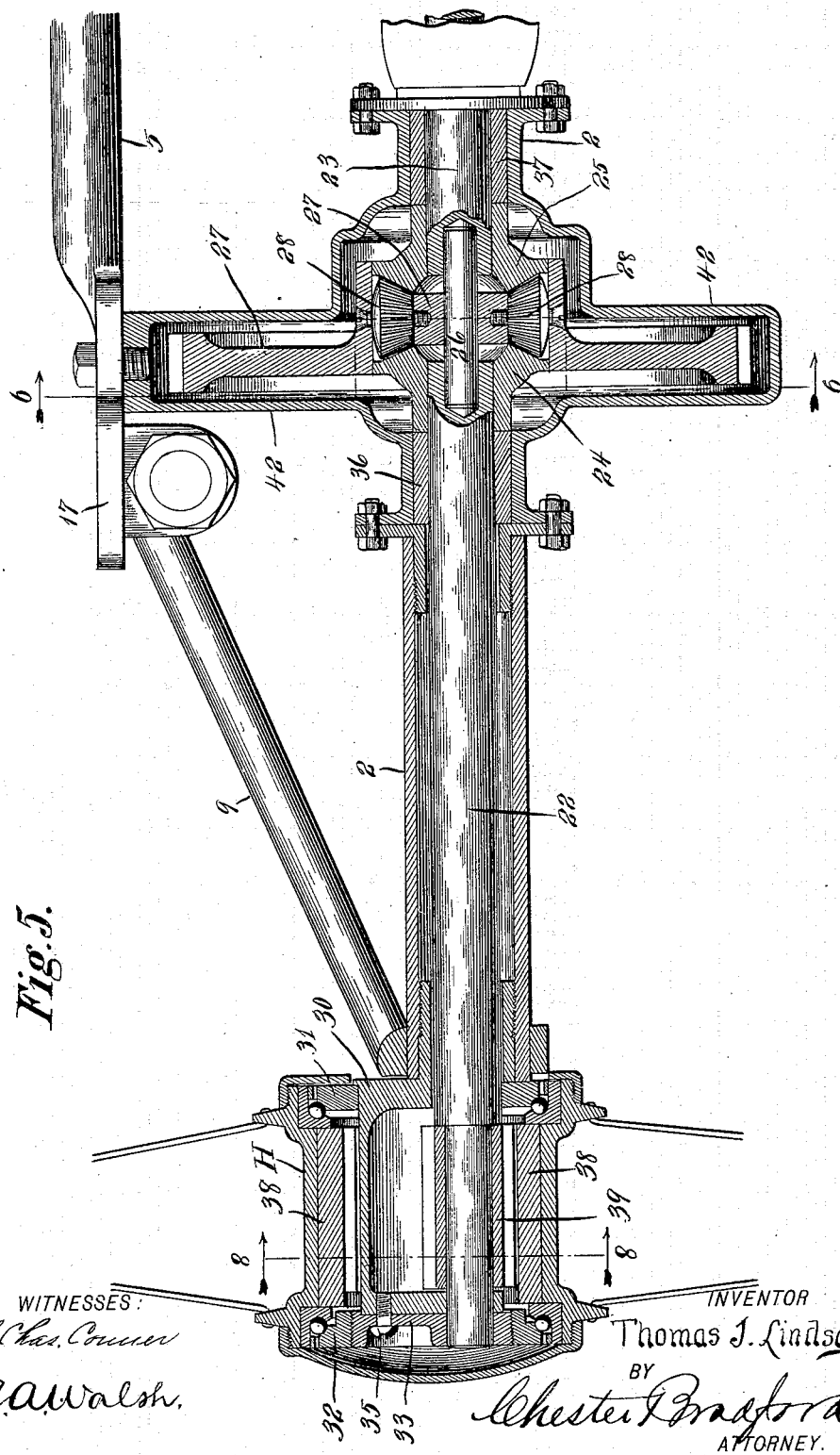

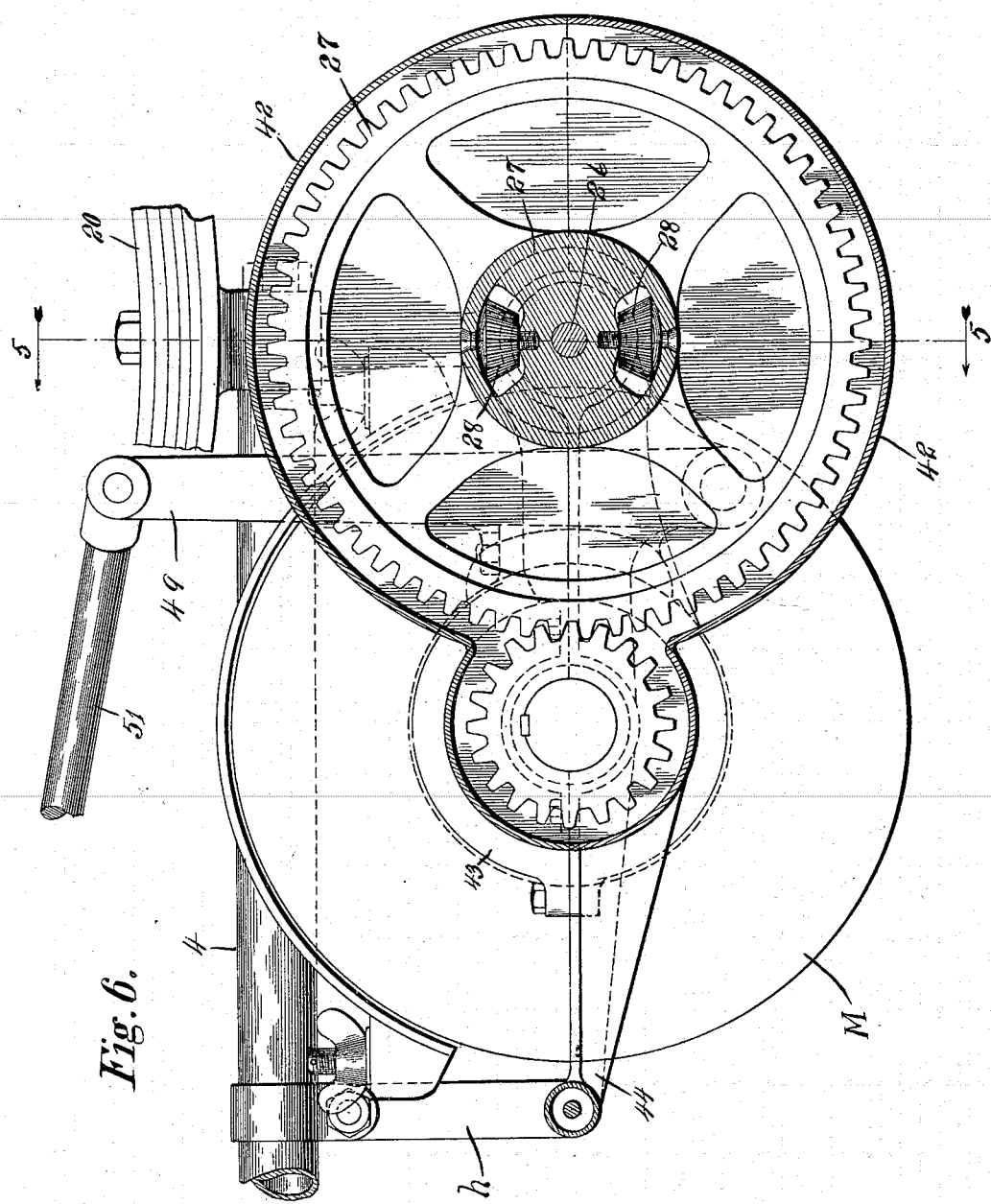

UNITED STATES PATENT OFFICE.

THOMAS J. LINDSAY, OF LAFAYETTE, INDIANA.

MOTOR-VEHICLE.

SPECIFICATION forming part of Letters Patent No. 612,360, dated October 11, 1898.

Application filed May 9, 1898. Serial No. 680,171. (No model.)

*To all whom it may concern:*

Be it known that I, THOMAS J. LINDSAY, a citizen of the United States, residing at Lafayette, in the county of Tippecanoe and State of Indiana, have invented certain new and useful Improvements in Motor-Vehicles, of which the following is a specification.

My present invention relates to that class of vehicles which have become known in popular parlance as "horseless carriages;" and it consists in various features of construction and arrangement whereby certain advantages are attained, as will be hereinafter more particularly described and claimed.

Figure 1:
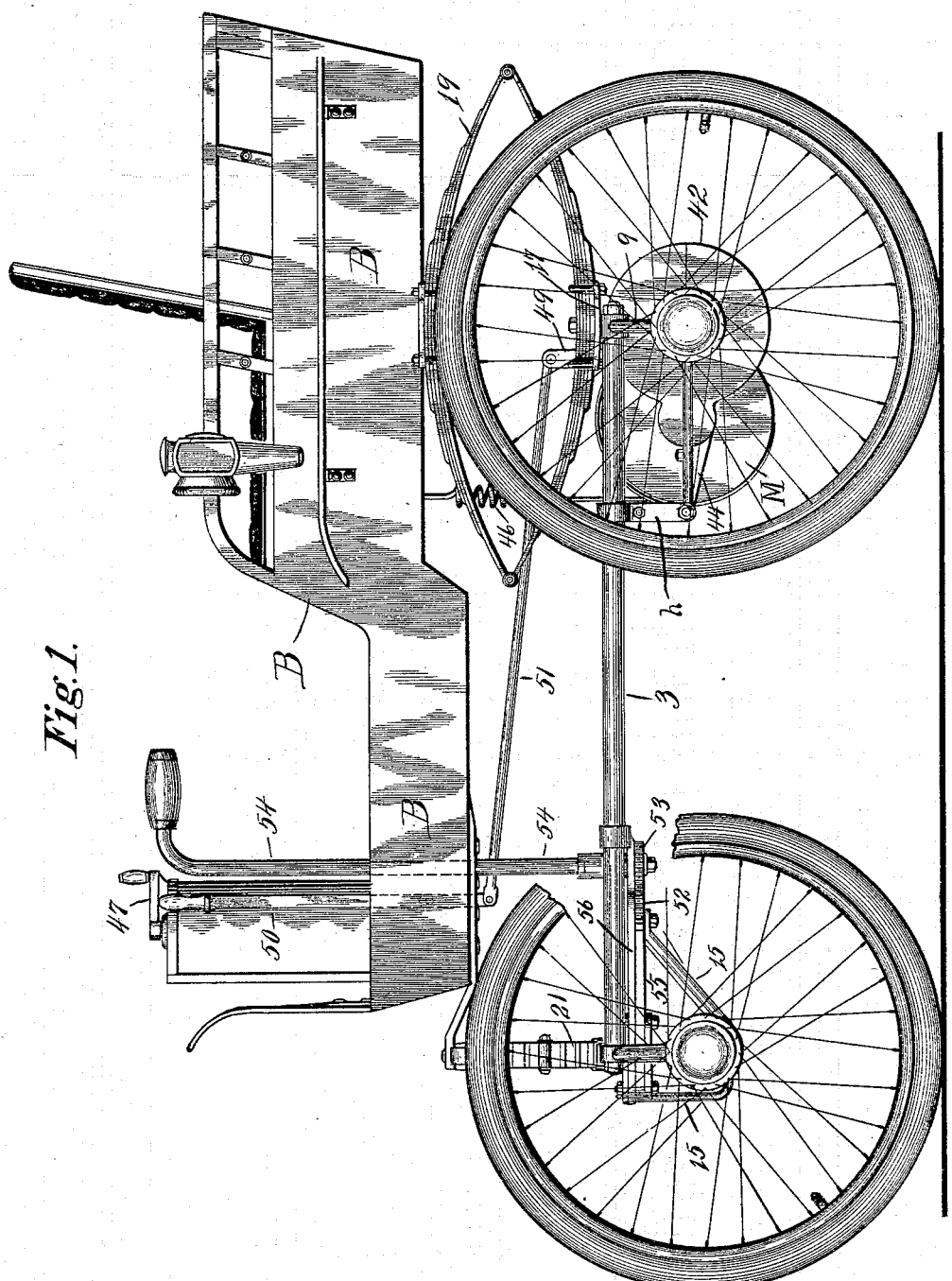
Figures 2, 10, 11:
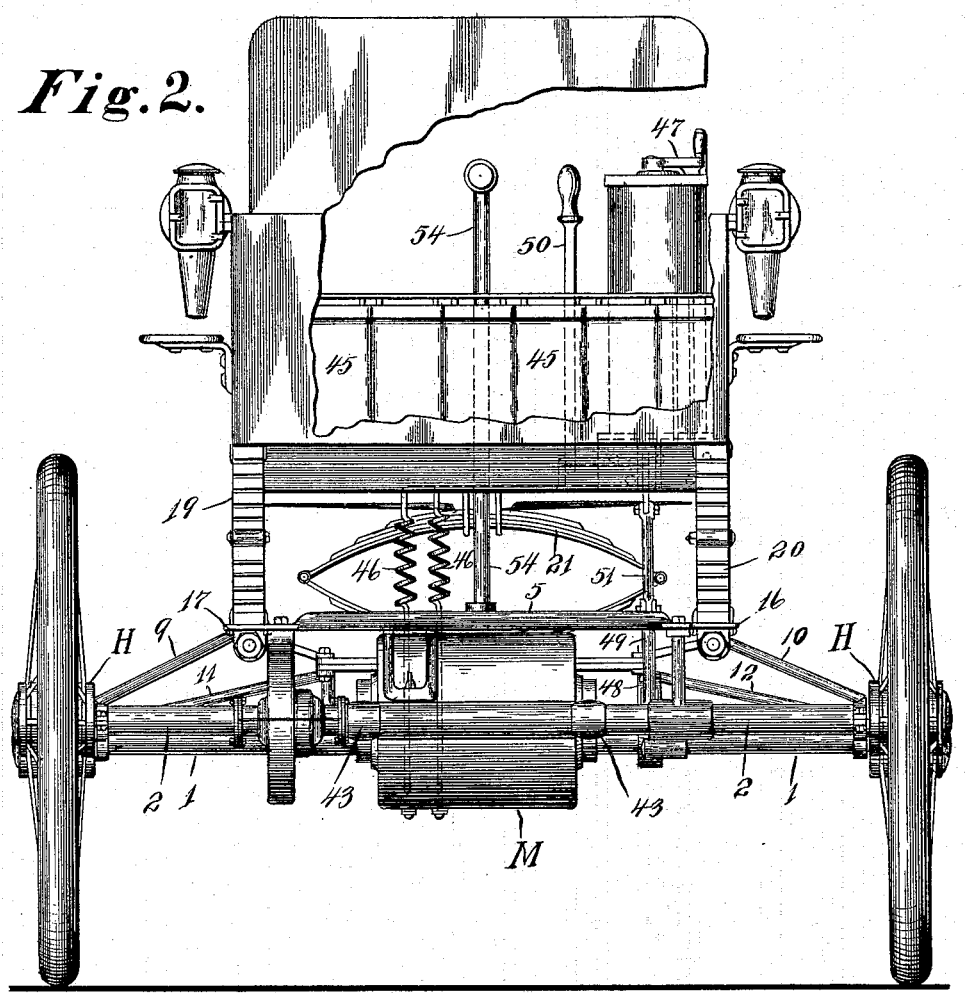
Figure 9:
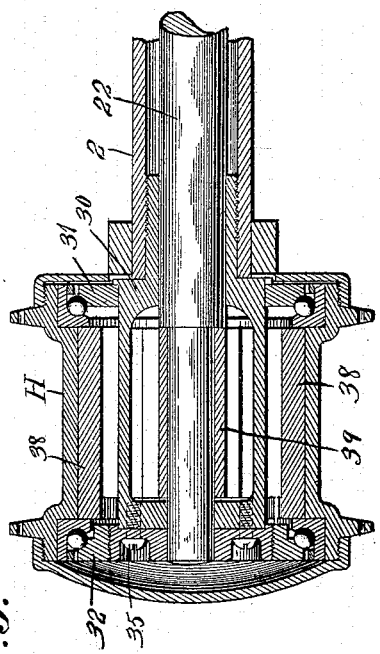
Figure 4:
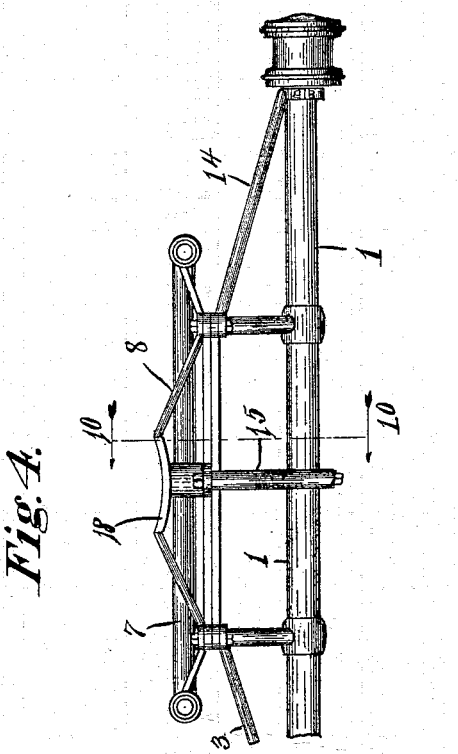
Figure 7:
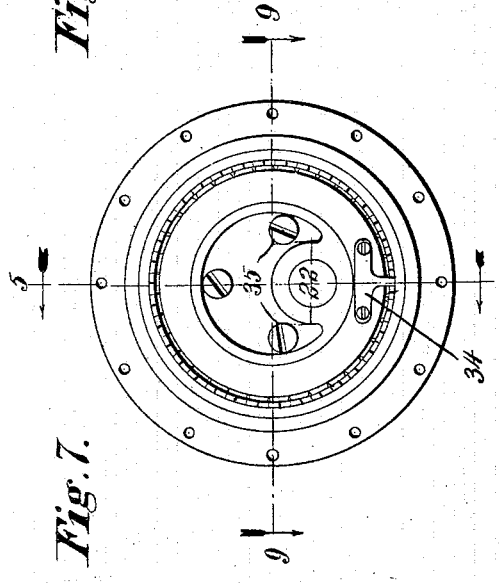
Figure 8:
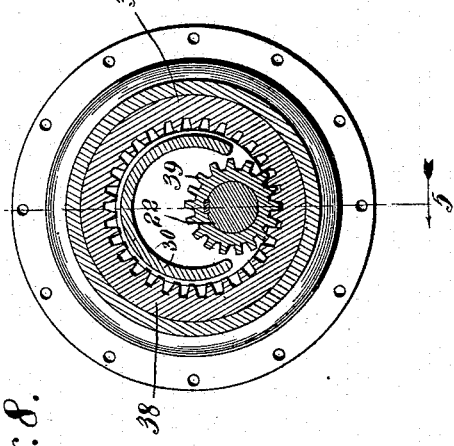

Referring to the accompanying drawings, which are made a part hereof, and on which similar letters and numerals of reference indicate similar parts, Figure 1 is a side elevation of a vehicle embodying my present invention; Fig. 2, a rear elevation of the same, a portion of the vehicle-body being broken away to show the parts beyond; Fig. 3, a top or plan view of the framework and running-gear of the vehicle, some portions of the inclosing casing being removed to show the elements of construction beneath; Fig. 4, a front elevation of the front-axle structure as seen from the dotted line 4 4 alongside Fig. 3; Fig. 5, a sectional view, on an enlarged scale, on the dotted lines 5 5 in Figs. 3, 6, 7, and 8; Fig. 6, a transverse sectional view on the dotted line 6 6 in Figs. 3 and 5; Fig. 7, an end elevation of one of the vehicle-hubs with the dust-cap removed; Fig. 8, a transverse sectional view on the dotted line 8 8 in Fig. 5; Fig. 9, a detail sectional view of the hub as seen from the dotted line 9 9 in Fig. 7; Fig. 10, a sectional view, on an enlarged scale, as seen from the dotted line 10 10 in Figs. 3 and 4; Fig. 11, a detail sectional view on the dotted line 11 11 in Fig. 10, and Fig. 12 a detail sectional view on the dotted line 12 12 in Fig. 3.

My improved vehicle has a peculiar framework and casing, within which all the mechanism and operating parts are inclosed. It consists of an axle-casing or hub-support carrier 2, longitudinal body-frame bars 3 and 4, transverse body-frame bars 5, 6, 7, and 8, and brace-bars 9, 10, 11, 12, and 15, and various minor parts, hereinafter to be mentioned as occasion may require. These parts being all strongly united may be designated together as the "frame-and-casing" structure. At the front end is a front-axle structure composed of an axle-bar 1, braces 13 and 14, the fifth-wheel members 55, and certain minor parts. The two structures are pivotally united, as best shown in Figs. 11 and 12. This structure is provided with suitable plate-like bearings 16, 17, and 18, attached to or forming continuations of the brace-bars and which carry vehicle-springs 19, 20, and 21 of a usual and well-known form, which springs in turn carry the vehicle-body B. Within the carrier or axle-casing 2 of the framework is situated the rear axle of the vehicle. Said axle, as best shown in Fig. 5, consists of two principal members 22 and 23, which respectively carry fixedly secured upon their adjacent ends bevel gear-wheels 24 and 25. Said ends also contain longitudinal perforations into which the ends of a centering-pin 26 extend. A large spur gear-wheel 27, by which this axle is driven, as will be presently described, has an enlarged hub which, as best shown in Figs. 5 and 6, is cut out at the sides to receive the bevel gear-wheels 24 and 25, and is also cut entirely through at two points, preferably arranged oppositely to each other, to receive bevel-pinions 28. The central portion of said hub is solid, except that it has a perforation for the centering-pin 26, through which said centering-pin extends, as shown. The peripheries of the bevel gear-wheels 24 and 25 are made true and constitute parts of the bearing by which the wheel 27 is carried, the centering-pin constituting the remaining parts of the bearing or supporting instrumentality for said wheel. As in use the wheels are driven from the axle, it is highly desirable at times when one wheel must advance more rapidly than the other, as in turning corners, that the wheels should have a movement relatively to each other, while of course it is imperative that the aggregate movement of each wheel shall be precisely equal to that of the other. As the bevel gear-wheels 24 and 25 are fixedly mounted upon the axle parts 22 and 23, and as the bevel-pinions 28 are carried wholly by the hub of the wheel 27, and as said bevel gear-wheels and said pinions are arranged to engage with each other, it is obvious that the above-described required movement is secured.

Referring now particularly to Figs. 5, 7, 8, and 9, it will be seen that that portion of the framework which I have denominated the "axle-casing" or "wheel-support carrier" 2 surrounds the axle and extends out close to the hub H of the wheel. Upon the outer end of said casing or carrier is a wheel-support 30, which is positioned eccentrically to the axle and upon which the hub of the wheel is mounted, preferably by means of suitable ball-bearings, including the cones 31 and 32, as shown. The cone 32 is screw-threaded onto the end plate 33, and is thus rendered adjustable, so that wear may be taken up and a proper relation of the parts secured. The edge of said cone contains radial notches, as shown in Fig. 7, and a detent 34, secured to the plate 33, is adapted to engage with any of said notches as may be desired, it being only necessary to raise said detent out of engagement with the notches, turn the cone, and again fasten the detent into place. Said plate 33 is secured to the wheel-support 30 by screws 35, and said plate has a suitable perforation which forms a bearing for the extreme outer end of the axle part 22, as shown. The other end of said axle part is supported by a suitable bushing 36, secured within the tubular frame part or axle-casing 2, as shown in Fig. 5. The adjacent end of the axle part 23 is supported by a similar bushing 37, which forms a bearing therefor.

Within the shell of the wheel-hub is secured an internally-toothed gear-sleeve 38, and upon the outer end of the axle part 22 is a corresponding pinion 39, which engages therewith. The relation of these parts is best shown in Figs. 5 and 8. The construction upon the opposite side of the vehicle, at the other end of the axle part 23, is identical with that just described. By means of this arrangement the wheels are driven with an increased power, the motor being designed to run at a much higher speed than that at which such vehicle-wheels ought to revolve.

The motor M is shown as an electric motor and has been selected as of a type suitable to my present requirements. Upon one end of its armature-shaft 40 is a pinion 41, which is adapted to engage with the spur gear-wheel 27, and thus drive the axle 22 23. The axle-casing is shown as having an enlarged portion 42, which extends out around and incloses this pinion and gear-wheel, as perhaps best shown in Fig. 3. In the type of motor shown the inclosing shell and fields are formed integrally. Along one side of said shell is a groove which partially incloses the axle-casing 2, so that said shell is prevented from revolving. Arms 43, carried by said axle-casing, extend out and engage the ends of the motor-case and hold it into proper relation. Suitable bridge-trees 44, extending across from the axle-casing 2 to appropriate hangers h, carried from the frame parts above, support bearings for the armature-shaft 40. Thus all the parts are held into proper relation to coöperate with each other.

As a means for actuating the motor I have shown a set of storage batteries 45 mounted within the vehicle-body behind and under its seat, these being connected to said motor in the usual manner by line-wires 46, all as shown in Fig. 2. The current is adapted to be turned on and off and reversed by the usual means for this purpose, generally known as a "controller," which the occupant of the vehicle operates by means of the handle 47.

Suitably mounted upon the armature-shaft 40 is a friction-wheel 48, and suitably mounted on the adjacent bridge-tree 44 is a brake-bar 49, carrying a brake-shoe 50, which is adapted to be forced into contact with the friction-wheel 48 by means of the hand-lever 50, which is connected thereto by means of a connecting-rod 51. Said lever 50 is conveniently positioned in the front part of the vehicle-body, where it can be easily reached by the occupant of the vehicle, as best shown in Fig. 1.

At the front of the body-frame, above and near the front axle or axle-casing, is situated a fifth-wheel, by means of which the front axle is enabled to be swung on its king-bolt and the course of the vehicle thus guided. Upon the rear side of that member 55 which is connected to the front-axle structure is a segmental rack-bar 52, with which the segmental pinion 53 on a vertical shaft 54 engages, which shaft is carried in suitable bearings and extends up through the bottom of the vehicle-body to a position in front of the occupant of the vehicle, where it carries a suitable handle. The upper fifth-wheel member 56 is rigidly attached to and forms a part of the frame-and-casing structure.

As shown in Fig. 2, the handle 47, the lever 50, and the upright handle 54 to the rock-shaft are positioned near to each other, where they can be conveniently reached and operated.

The parts of the frame have already been mentioned. It will be noticed that by means of this frame-and-casing structure the mechanism or operative parts are all inclosed and the entire structure is carried from the parts 30, which I have denominated "wheel-supports." This is best illustrated in Fig. 5, where the connection and arrangement are clearly shown. As will be seen by an examination of said figure, the axle-casing 2 carries the wheel-supports 30, while the gear-casing 42 is formed integrally therewith. The cross-bar 5 is secured firmly to said gear-casing, and the brace 9 is also connected to said bar 5, while its outer end encircles and is firmly secured to the axle-casing 2 at a point closely adjacent to the wheel-support 30. Just above this brace connection is a plate-like bearing or saddle 17 for the corresponding vehicle-spring. Those portions of what I have generally denominated the "axle-casing," which extend out and carry the wheel-supports 30, I prefer to make tubular, as shown, in order to exclude the dust and guard the axle from contact. Obviously, however, any construction which would efficiently sustain said wheel-supports may be used without departing from my invention, and I therefore do not desire to be understood as limiting myself to the tubular form shown, although I prefer it.

Having thus fully described my said invention, what I claim as new, and desire to secure by Letters Patent, is—

1. The combination, in a vehicle, of a framework, wheel-supports carried by said framework, wheels mounted on said wheel-supports, a casing also carried by said framework, a gearing and an axle within said casing, a motor whereby said axle is driven, said axle extending out and having bearings in said wheel-supports, pinions on the ends of said axle, and internal gears in the hubs of said wheels with which said pinions will engage, the wheels and the axle having independent bearings in the wheel-support structures.

2. The combination, in a vehicle, of vehicle-wheels having large hollow hubs, wheel-supports entering said hubs and composed of the structures 30 33 constructed and arranged substantially as shown and described, an axle 22 23 the outer ends whereof are supported in bearings in the parts 33, pinions on said axle, internal gear-rings within the hubs of the wheels intermediate the bearings of said wheel-hubs on said wheel-supports and with which said pinions will engage, a frame-and-casing structure rigidly connected to said wheel-supports, and a suitable motor and a vehicle-body carried by said frame-and-casing structure.

3. The combination, in a vehicle, of a frame-and-casing structure carrying wheel-supports rigidly formed thereon, an axle for said wheels carried by said frame-and-casing structure and composed of the parts 22, 23 and 26, bevel gear-wheels 24 and 25 mounted on the ends of the parts 22 and 23 which are also formed to support a driving-gear 27, a series of bevel-pinions 28 carried by the hub of said wheel 27, said driving-wheel, and a suitable motor therefor, substantially as set forth.

4. The combination, in a vehicle, of a driving-axle carrying the main vehicle-wheels and composed of parts, bevel gear-wheels mounted upon the adjacent ends of said parts and forming also a bearing for a driving-wheel, said driving-wheel, the hub whereof is formed to extend over and rest upon the peripheries of said bevel gear-wheels, and pinions carried by the hub of said driving-wheel and engaging with said bevel gear-wheels, substantially as and for the purposes set forth.

5. The combination, in a vehicle, with the wheels, axle and motor, of a framework having tubular extensions or axle-casings 2 by which the wheel-supports are carried, a casing 42 secured to the main portion of said frame, and braces 9, 10, 11 and 12 running from the frame of the vehicle to near the wheel-supports, said frame being also adapted to receive and carry the vehicle-body by means of springs or otherwise, said several parts constituting a frame-and-casing structure and being constructed, arranged and operating substantially as shown and described.

6. The combination, in a vehicle, of the body-frame including an axle-casing for the rear axle, a motor positioned alongside said axle-casing, arms extending from said axle-casing and supporting the motor-casing, bridge-trees carried by said framework and carrying the armature-shaft, a pinion on said armature-shaft, an axle in said axle-casing, a spur gear-wheel thereon engaging with the pinion on the armature-shaft, a friction-wheel also on said armature-shaft, and a brake mounted on the vehicle-frame and adapted to engage with said friction-wheel, the handle for said brake being positioned in the front part of the vehicle-body, with a connecting-rod running from said lever to said brake-bar.

7. A framework for vehicles, composed of the several bars, braces and casings 2, 3, 4, 5, 6, 7, 8, 9, 10, 11, 12, 15 and 42, constructed and arranged substantially as shown and described.

8. The combination, in a vehicle, with a suitable motor and the vehicle-frame, of a tubular axle-casing on said frame inclosing the driven axle, and having wheel-supports on its outer ends, wheels mounted on said wheel-supports the hubs whereof contain internally-toothed gear-rings, and an axle within said tubular axle-casing and having pinions on its ends which engage with said gear-rings.

9. The combination, in a vehicle, of the vehicle-frame, rigid extensions on said vehicle-frame carrying wheel-supports at their outer ends, wheels mounted on said wheel-supports the hubs whereof contain internally-toothed gear-rings, an axle supported at its outer end in said wheel-supports and having pinions which engage with said gear-rings in the wheel-hubs, and a suitable motor for driving said axle.

In witness whereof I have hereunto set my hand and seal, at Indianapolis, Indiana, this 4th day of May, A. D. 1898.

THOMAS J. LINDSAY. [L. S.]

Witnesses:
CHESTER BRADFORD,
JAMES A. WALSH.